(12) United States Patent
Horvath et al.

(10) Patent No.: US 10,272,878 B2
(45) Date of Patent: Apr. 30, 2019

(54) WIPER ARM ARRANGEMENT

(71) Applicant: Robert Bosch GmbH, Stuttgart (DE)

(72) Inventors: Zsofia Horvath, Balatonfüzfo (HU); Harald Rapp, Buehl (DE); Michael Kruse, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 15/326,721

(22) PCT Filed: Jul. 13, 2015

(86) PCT No.: PCT/EP2015/065983
§ 371 (c)(1),
(2) Date: Jan. 17, 2017

(87) PCT Pub. No.: WO2016/008852
PCT Pub. Date: Jan. 21, 2016

(65) Prior Publication Data
US 2017/0210343 A1    Jul. 27, 2017

(30) Foreign Application Priority Data
Jul. 17, 2014   (DE) ........................ 10 2014 213 988

(51) Int. Cl.
*B60S 1/34* (2006.01)
*B60S 1/40* (2006.01)
*B60S 1/52* (2006.01)

(52) U.S. Cl.
CPC ........... *B60S 1/3425* (2013.01); *B60S 1/3415* (2013.01); *B60S 1/3429* (2013.01); *B60S 1/3447* (2013.01); *B60S 1/40* (2013.01); *B60S 1/522* (2013.01)

(58) Field of Classification Search
CPC .... B60S 1/3425; B60S 1/3415; B60S 1/3431; B60S 1/3429; B60S 1/3447; B60S 1/522; B60S 1/524
USPC ................ 15/250.351, 250.352, 250.04
See application file for complete search history.

(56) References Cited

U.S. PATENT DOCUMENTS

| 3,670,354 A | 6/1972 | Weber |
| 3,916,473 A * | 11/1975 | Williams ............... B60S 1/524 15/250.04 |
| 4,133,071 A * | 1/1979 | Jaske ..................... B60S 1/522 15/250.04 |
| 5,327,614 A | 7/1994 | Egner-Walter et al. |

(Continued)

FOREIGN PATENT DOCUMENTS

| CN | 103507776 A | 1/2014 |
| EP | 2591958 A1 | 5/2013 |

(Continued)

OTHER PUBLICATIONS

International Search Report for Application No. PCT/EP2015/065983 dated Oct. 8, 2015 (English Translation, 3 pages).

*Primary Examiner* — Gary K. Graham
(74) *Attorney, Agent, or Firm* — Michael Best & Friedrich LLP

(57) ABSTRACT

The invention is directed to a wiper arm arrangement comprising a wiper bar (10), a coupling unit (12) and a fastening unit (14) for securing the coupling unit (12) to the wiper bar (10). According to the invention, the coupling unit (12) has a crimped profile (16, 54) which, in a mounted state, is to be connected to a washer fluid hose (18).

6 Claims, 5 Drawing Sheets

(56) References Cited

U.S. PATENT DOCUMENTS

| | | |
|---|---|---|
| 5,724,699 A | 3/1998 | Bexten |
| 6,094,772 A | 8/2000 | West |
| 8,544,138 B2 * | 10/2013 | Boland ................ B60S 1/3429 15/250.351 |
| 2003/0009841 A1 | 1/2003 | Sato |
| 2014/0345076 A1 | 12/2014 | Banno et al. |

FOREIGN PATENT DOCUMENTS

| | | |
|---|---|---|
| EP | 2813402 A1 | 12/2014 |
| JP | 2002302019 | 10/2002 |
| WO | 9221537 A1 | 12/1992 |

* cited by examiner

WIPER ARM ARRANGEMENT

BACKGROUND OF THE INVENTION

A wiper arm arrangement comprising a wiper bar, a coupling unit and a fastening unit for securing the coupling unit to the wiper bar has already been proposed.

SUMMARY OF THE INVENTION

The invention relates to a wiper arm arrangement comprising a wiper bar, a coupling unit and a fastening unit for securing the coupling unit to the wiper bar.

According to the invention, the coupling unit has a crimped profile which, in a mounted state, is to be connected to a washer fluid hose. As a result, the washer fluid hose can be advantageously connected to the wiper bar and/or coupling unit in a cost effective and secure manner. In this context, "wiper bar" refers particularly to a bar that is designed to connect an articulation piece of a wiper arm to a wiper arm adapter of the wiper arm. The wiper bar preferably forms a painted metal bar. Furthermore, a cross-section of the wiper bar is advantageously designed in the shape of a rectangle. In this context, a "coupling unit" refers particularly to a wiper arm adapter and/or an articulation piece. By the term "wiper arm adapter", an adapter is to be understood in this context which has a contact region with a wiper arm component and is captively connected to the wiper arm component and is designed to provide a coupling region of said wiper arm component for coupling and/or contacting to a wiper blade adapter. In this context, a "wiper blade adapter" refers particularly to an adapter which has a contact region with a wiper blade component and is captively connected to the wiper blade component and is designed to provide a coupling region of the wiper blade component for coupling and or contacting to a wiper arm adapter. An "articulation piece" particularly refers in this context to a component that is pivotably connected via a joint to a fastening part, which is designed to be coupled to a wiper drive shaft. The wiper drive shaft can be driven by a wiper motor or a wiper linkage alternately in opposite directions of rotation. By the term "fastening unit", a unit is to be understood in this context which is provided to secure the coupling unit to the wiper bar. In this context, a crimped profile refers particularly to a profile that is provided to be bent during a mounting procedure and in so doing to fix at least one further element in a positive-locking or force-fitted manner. The crimped profile is particularly designed to be handled with a crimping tool, preferably a crimping pliers. The term "designed" is particularly to be understood in this context as specially configured or equipped. By the fact that an object is provided for a certain function, it should be understood that the object fulfills and/or carries out this certain function in at least one usage and/or operating state.

In a further configuration of the invention, it is proposed that the crimped profile has at least one first crimped lug, which is provided to for the purpose of bending the washer fluid hose. As a result, a particularly simple fastening of the washer fluid hose to the wiper bar and/or the coupling unit can be achieved. The at least one first crimped lug advantageously has a longitudinal extension of less than 10 mm, preferably less than 5 mm.

In addition, it is proposed that the crimped profile has at least one second crimped lug that is provided in order for the washer fluid hose to be bent. As a result, a particularly secure fastening of the washer fluid hose to the wiper bar and/or the coupling unit can be achieved.

In addition, it is proposed that the at least one first crimped lug and the at least one second crimped lug are disposed at the same height in a wiper bar longitudinal direction. In so doing, the washer fluid hose can advantageously be held parallel to a longitudinal extension of the wiper bar.

Furthermore, it is proposed that the fastening unit has at least one main crimped profile for crimping the wiper bar. As a result, a particularly secure and cost-effective fastening of the wiper bar to the coupling unit can be achieved.

It is furthermore proposed that the at least one main crimped profile is separated from the crimped profile at least in certain regions via at least one recess. In so doing, both crimped profiles can advantageously be formed from a single profile. The recess advantageously has an extension of less than 10 mm, preferably less than 5 mm.

It is furthermore proposed that the coupling comprise a wiper arm adapter, which is provided to be coupled to a wiper blade adapter. As a result, a particularly secure mounting of the washer fluid hose to the wiper arm adapter can be achieved.

In addition, it is proposed that the coupling unit comprise an articulation piece, which is provided to be coupled to a drive shaft fastening part. As a result, a particularly secure mounting of the washer fluid hose to the drive shaft fastening part can be achieved.

In a further configuration of the invention, it is proposed that the crimped profile be designed substantially metallically. In so doing, a particularly long service life of the crimped profile can be achieved.

In addition, a method for connecting a washer fluid hose to a wiper bar is proposed, wherein a coupling unit is fastened to the wiper bar and wherein the washer fluid hose is crimped to the coupling unit and/or to the wiper bar. As a result, the wiper fluid hose can advantageously be connected to the wiper bar and/or to the coupling unit in a cost-effective and secure manner.

The wiper arm arrangement according to the invention is not to be limited to the usage and embodiment described above. The wiper arm arrangement according to the invention can particularly have a number which deviates from a number of individual elements, components and units mentioned above in order to fulfill a functionality described herein.

BRIEF DESCRIPTION OF THE DRAWINGS

Further advantages ensue from the following description of the drawings. An exemplary embodiment of the invention is depicted in the drawings. The drawings, the description and the claims contain numerous features in combination. The person skilled in the art will be able to expediently consider the features individually and will be able to put said features together to form useful further combinations.

In the drawings.

DETAILED DESCRIPTION

Figure 1:
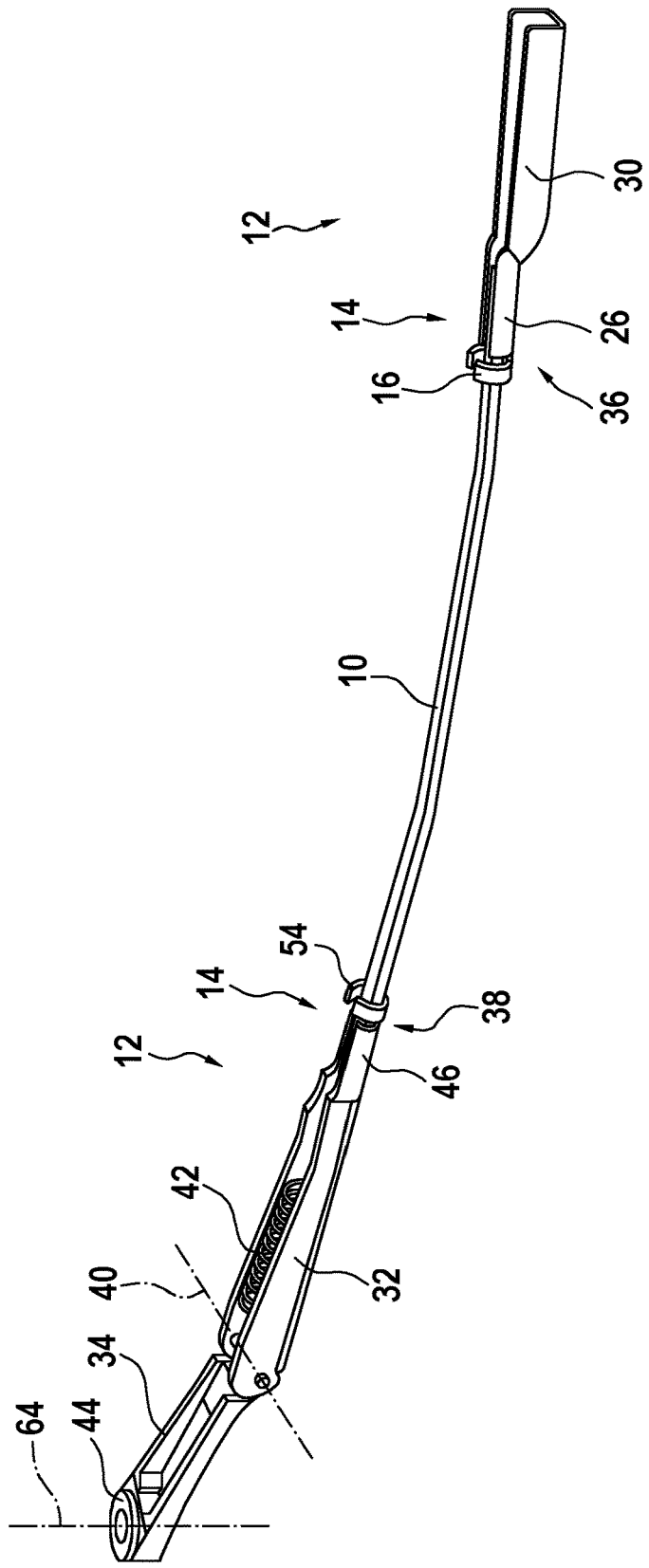
FIG. 1 shows a wiper arm arrangement according to the invention in a perspective view.

A wiper arm arrangement comprising a wiper bar 10 and a coupling unit 12 is shown in FIG. 1. The wiper arm arrangement is provided for guiding a wiper blade 52 over a vehicle window pane. The wiper arm arrangement pivots about a drive axis 64 during a wiping process. The wiper arm arrangement is particularly provided for use on a passenger motor vehicle and/or on a truck. The wiper bar 10 has a substantially rectangular cross-section. Furthermore, the wiper bar 10 is formed from a painted metal.

The coupling unit 12 comprises two functions. On the one hand, the coupling unit 12 is provided to couple the wiper bar 10 to a drive shaft that is not shown in detail. On the other hand, the coupling unit 12 is provided to couple the wiper bar 10 to the wiper blade 52, in particular to a wiper blade adapter 52 disposed on the wiper blade 52. To this end, the coupling unit 12 comprises a wiper arm adapter 30 and an articulation piece 32. The wiper arm adapter 30 is disposed at a free end 36 of the wiper bar 10. The wiper arm adapter 30 has a special geometry which is known to the person skilled in the art and which allows for a releasable coupling to a wiper arm adapter. The wiper arm arrangement has a fastening unit 14. The fastening unit 14 is provided to connect the wiper arm adapter 30 to the wiper bar 10. To this end, the fastening unit 14 has a main crimped profile 26. The main crimped profile 26 is designed integrally with the wiper arm adapter 30. The main crimp profile 26 is pressed fixedly to the wiper bar 10.

The articulation piece 32 is disposed at the second free end 38 of the wiper bar 10. The second free end 38 lies opposite to the first free end 36. The articulation piece 32 is connected to the drive shaft fastening part so said piece can be pivoted about a pivot axis 40. A tension spring 42 holds the articulation piece 32 in end position relative to the drive shaft fastening part 34. The drive shaft fastening part 34 has a drive hub 44, which is provided to receive the drive shaft that is not depicted. The fastening unit 14 is provided to connect the articulation piece 32 to the wiper bar 10. The fastening unit 14 has a further main crimped profile 46 for this purpose. The further main crimped profile 46 is connected integrally to the articulation piece 32. The further main crimped profile 46 is fixedly pressed to the wiper bar 10.

Figure 2:
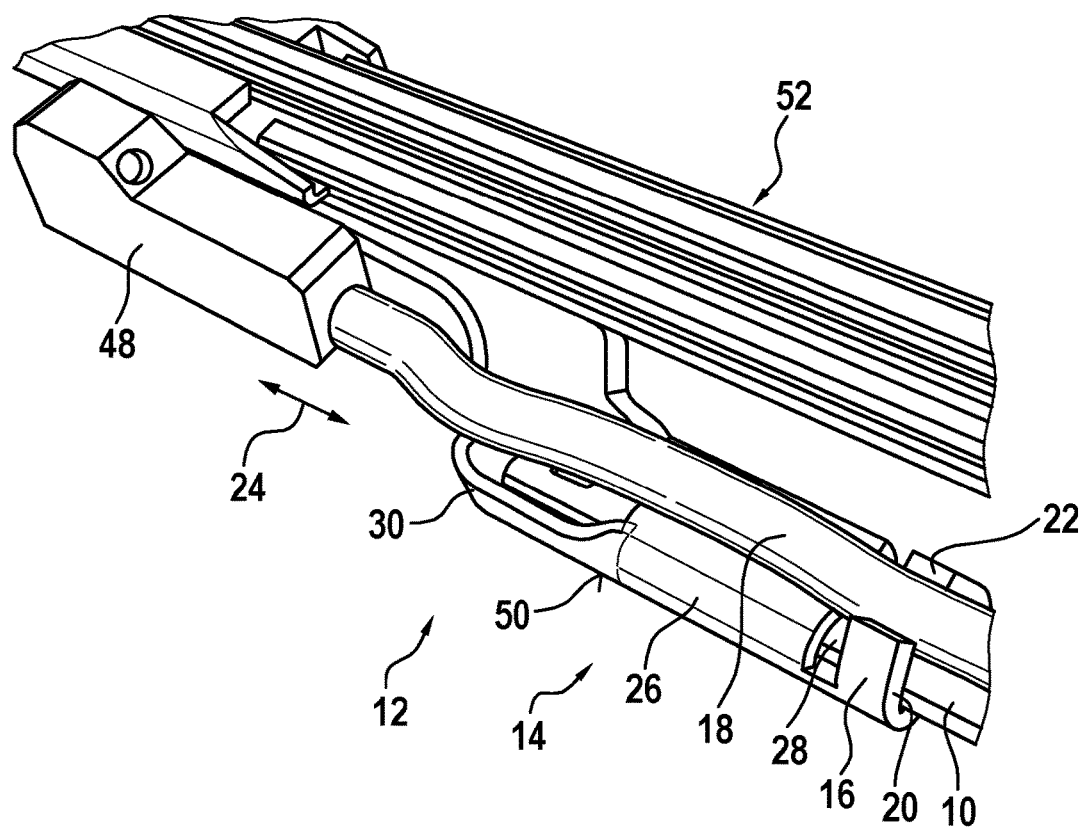
FIG. 2 shows a wiper arm adapter of a coupling unit of the wiper arm arrangement according to FIG. 1, a fastening unit and a washer fluid hose in a perspective view.

In FIG. 2, the wiper arm adapter 30 and a washer fluid hose 18 of the wiper arm arrangement are shown, which are not depicted in FIG. 1 for reasons of clarity. The washer fluid hose 18 is provided to guide washer fluid from a washer fluid source that is not depicted to a spray nozzle 48. It is also conceivable in this regard that the washer fluid hose 18 is provided to guide wiper fluid to a plurality of spray nozzles. The washer fluid hose 18 is formed from a rubber hose. The spray nozzle 48 is disposed on the wiper arm adapter 30. It is also conceivable in this regard that the spray nozzle 48 is disposed on a component of the wiper blade 52.

The coupling unit 12 has a crimped profile 16. In a mounted state, the crimped profile 16 is provided for a connection to the washer fluid hose 18. The crimped profile 16 is designed metallically. The crimped profile 16 has a first crimped lug 20. The first crimped lug 20 is bent around the washer fluid hose 18. The first crimped lug 20 has a longitudinal extension of 5 mm. The longitudinal extension runs parallel to a wiper bar longitudinal direction 24. The crimped profile 16 has a second crimped lug 22. The second crimped lug 22 is bent around the wiper fluid hose 18. The second crimped lug 22 has a longitudinal extension of 5 mm.

The first crimped lug 20 and the second crimped lug 22 are disposed at the same height in the wiper bar longitudinal direction 24. The first crimped lug 20 and the second crimped lug 22 are designed mirror-symmetrically to one another. A gap is arranged between free ends of the first crimped lug 20 and the second crimped lug 22. The first crimped lug 20 and the second crimped lug 22 are disposed in one free end of the wiper arm adapter 30.

In the mounted state shown, the first crimped lug 20 and the second crimped lug 22 are in contact with the washer fluid hose 18 in a positive-locking and force-fitted manner. The first crimped lug 20 and the second crimped lug 22 gently press on the washer fluid hose 18 and thus prevent the washer fluid hose 18 from slipping in the wiper bar longitudinal direction 24. The first crimped lug 20 and the second crimped lug 22 starting from a surface 50 of the wiper arm adapter 30 extend in a direction facing the vehicle window pane.

The main crimped profile 26 is separated in some regions from the crimped profile 16 via at least one recess 28. The recess 28 has an extension of 5 mm. The main crimped profile 26 forms a mounting surface for the washer fluid hose 18 in some regions.

Figure 3:
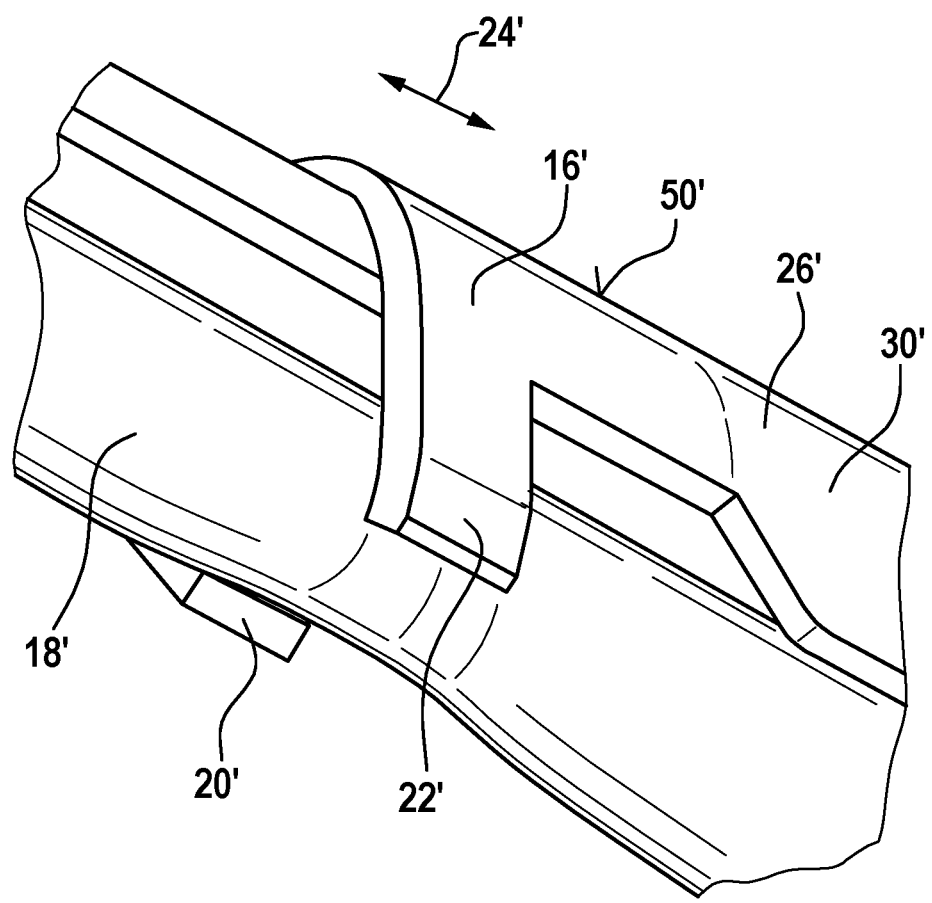
FIG. 3 shows a wiper arm adapter according to FIG. 2 in a perspective detailed view.

FIG. 3 shows an alternative configuration, wherein the crimped profile 16' directly adjoins the main crimped profile 26'. The first crimped lug 20' and the second crimped lug 22' are in contact with the washer fluid hose 18' in a positive-locking and force-fitted manner. The first crimped lug 20' and the second crimped lug 22' gently push on the washer fluid hose 18' and thus prevent the washer fluid hose 18' from slipping in the wiper bar longitudinal direction 24'. The first crimped lug 20' and the second crimped lug 22' starting from the surface 50' of the wiper arm adapter 30' extend in the direction facing the vehicle window pane.

Figure 4:
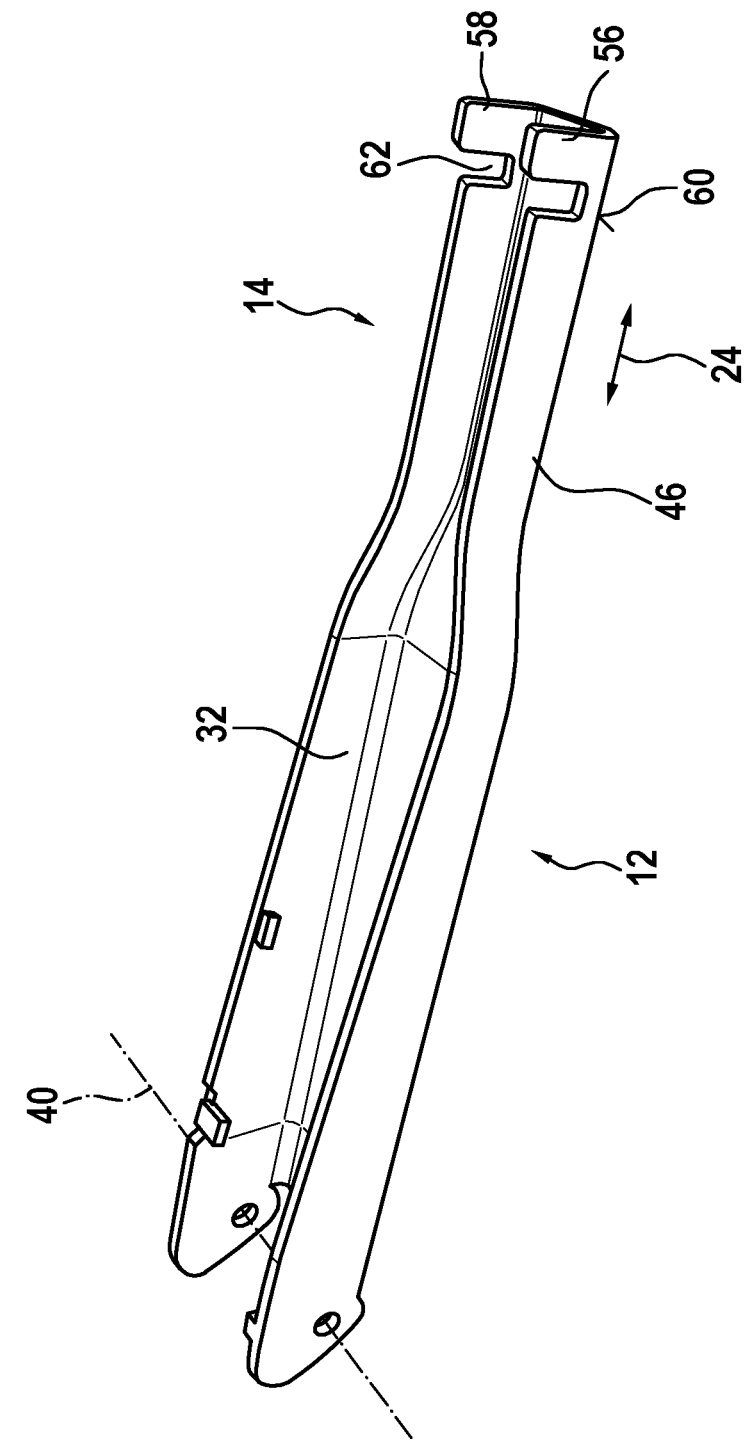
FIG. 4 shows an articulation piece of the coupling unit comprising a fastening unit in a perspective view.

In FIG. 4, the articulation piece 32 is shown prior to mounting. The coupling unit 12 has as a further crimped profile 54. The further crimped profile 54 is of metallic design. The further crimped profile 54 has a first crimped lug 56. The first crimped lug 56 is planarly designed. The first crimped lug 56 has a longitudinal extension of 5 mm. The longitudinal extension runs parallel to the wiper bar longitudinal direction 24. The further crimped profile 54 has a second crimped lug 58. The second crimped lug 58 has a longitudinal extension of 5 mm. The first crimped lug 56 and the second crimped lug 58 are disposed at the same height in the wiper bar longitudinal direction 24. The first crimped lug 56 and the second crimped lug 58 are designed mirror-symmetrically to one another. The first crimped lug 56 and the second crimped lug 58 are disposed in a free end of the articulation piece 32. A gap is arranged between the free ends of the first crimped lug 56 and the second crimped lug 58. The gap between the first crimped lug 56 and the second crimped lug 58 is at least equally large as a diameter of the washer fluid hose 18. The washer fluid hose 18 can thus be passed through the gap. The main crimped profile 46 is still open and provided for receiving the wiper bar 10.

Figure 5:
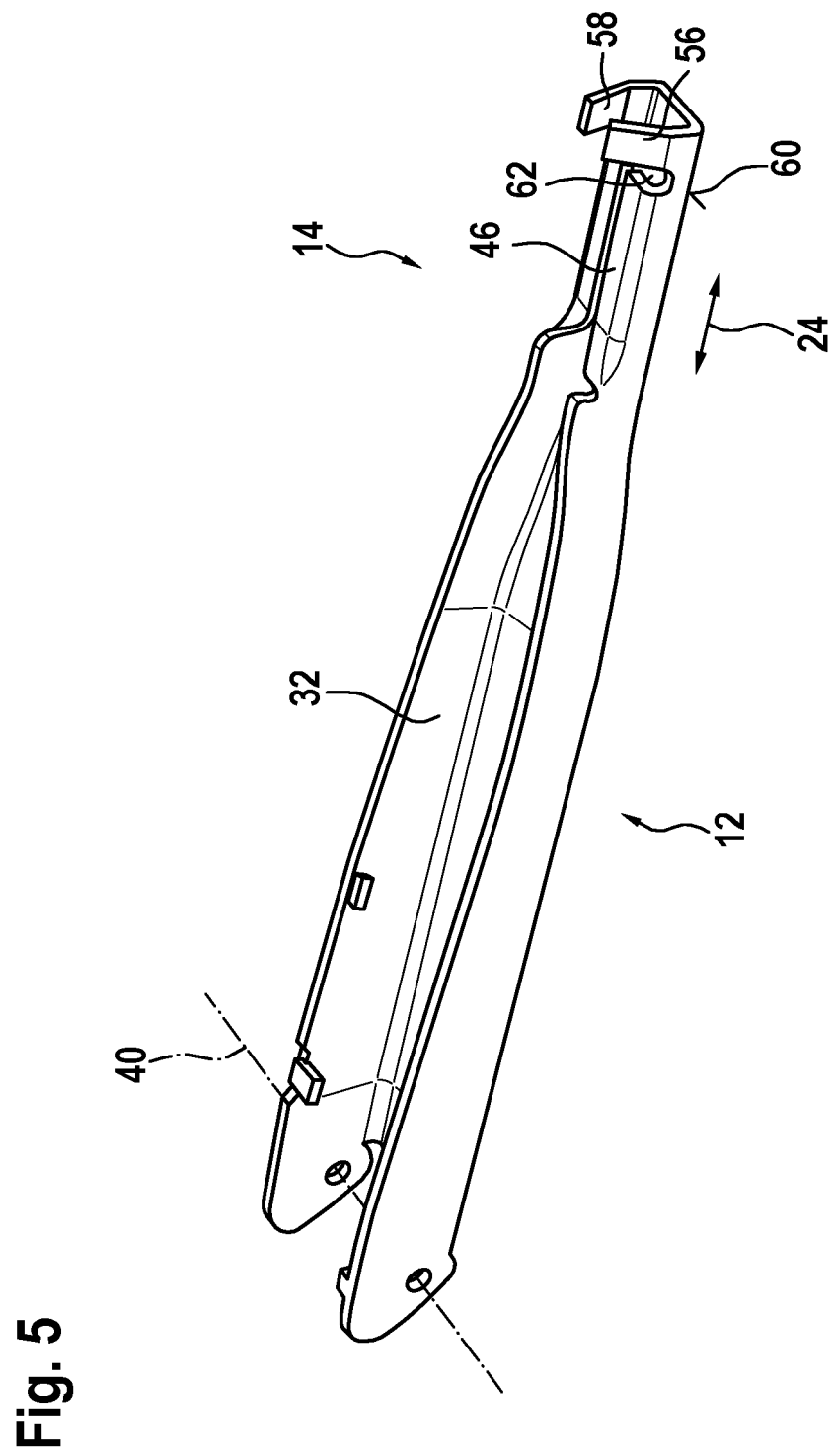
FIG. 5 shows the articulation piece according to FIG. 4 in a further perspective view.

In a mounted state, the main crimped profile 46 is bent around an angle of 90° on both sides (FIG. 5). Besides the articulation piece 32, no further components are depicted for reasons of clarity. The first crimped lug 56 is bent around an angle of approximately 20° about the washer fluid hose 18. The second crimped lug 58 is likewise bent around an angle of approximately 20° about the washer fluid hose 18.

The first crimped lug 56 and the second crimped lug 58 are in contact with the washer fluid hose 18 in a positive-locking and form-fitted manner. The first crimped lug 56 and the second crimped lug 58 gently press on the washer fluid hose 18 and thus prevent the washer fluid hose 18 from slipping in the wiper bar longitudinal direction 24. The first crimped lug 56 and the second crimped lug 58 extend starting from the surface of the articulation piece 32 in the direction facing the vehicle window pane. The main crimped profile 46 is separated in certain regions from the crimped profile 54 via at least one recess 62. The recess 62 has an extension of 5 mm. The main crimped profile 46 forms a mounting surface for the washer fluid hose 18 in certain regions.

What is claimed is:

1. A wiper arm arrangement comprising an elongate wiper bar (10) that extends along a longitudinal direction (24), a coupling unit (12), a washer fluid hose (18), and a fastening unit (14) for securing the coupling unit (12) to the wiper bar (10), wherein the fastening unit (14) includes a main crimped profile (26, 46) having lugs bent around a portion of the wiper bar (10) to hold the wiper bar (10), characterized in that the coupling unit (12) has a crimped profile (16, 54) having lugs which are bent around the washer fluid hose (18) to hold the washer fluid hose (18) while the washer fluid hose (18) rests on the lugs of the main crimped profile (26, 46), such that the lugs of the main crimped profile (26, 46) are disposed between the wiper bar (10) and the washer fluid hose (18), and wherein the lugs of the main crimped profile are spaced from the lugs of the crimped profile of the coupling unit by a gap (28) along the wiper bar longitudinal direction (24).

2. The wiper arm arrangement according to claim 1, characterized in that the lugs of the coupling unit (16, 54) are configured to be disposed at the same height in a wiper bar longitudinal direction (24) in the mounted state.

3. The wiper arm arrangement according to claim 1, characterized in that the coupling unit (12) comprises a wiper arm adapter (30), which is configured to be coupled to a wiper blade adapter.

4. The wiper arm arrangement according to claim 1, characterized in that the coupling unit (12) comprises an articulation piece (32), which is configured to be coupled to a drive shaft fastening part (34).

5. The wiper arm arrangement according to claim 1, characterized in that the crimped profile (16, 54) of the coupling unit (12) is made at least substantially of metal.

6. A method for forming the wiper arm arrangement of claim 1, the method comprising crimping the lugs of the fastening unit (14) around the wiper bar (10), resting the washer fluid hose (18) on the lugs of the fastening unit (14), and crimping the lugs of the crimped profile (16, 54) of the coupling unit (12) around the washer fluid hose (18).

* * * * *